United States Patent
Lazic et al.

(10) Patent No.: US 9,551,628 B2
(45) Date of Patent: Jan. 24, 2017

(54) FLEXIBLE AUTOMATION CELL FOR PERFORMING SECONDARY OPERATIONS IN CONCERT WITH A MACHINING CENTER AND ROLL CHECK OPERATIONS

(71) Applicant: Automation Controls & Engineering, LLC, Dexter, MI (US)

(72) Inventors: Predrag Lazic, Dexter, MI (US); Chris Mackey, Dexter, MI (US); Steve Moore, Dexter, MI (US)

(73) Assignee: Automation Controls & Engineering, LLC, Dexter, MI (US)

( * ) Notice: Subject to any disclaimer, the term of this patent is extended or adjusted under 35 U.S.C. 154(b) by 153 days.

(21) Appl. No.: 14/673,932

(22) Filed: Mar. 31, 2015

(65) Prior Publication Data

US 2015/0276549 A1    Oct. 1, 2015

Related U.S. Application Data

(60) Provisional application No. 61/972,897, filed on Mar. 31, 2014.

(51) Int. Cl.
| | |
|---|---|
| *G01B 7/28* | (2006.01) |
| *G01M 13/02* | (2006.01) |
| *B23F 23/12* | (2006.01) |
| *B23F 23/02* | (2006.01) |
| *B25J 15/00* | (2006.01) |
| *B25J 21/00* | (2006.01) |
| *B23Q 7/04* | (2006.01) |
| *B23Q 17/20* | (2006.01) |
| *B23Q 17/00* | (2006.01) |

(52) U.S. Cl.
CPC ............ *G01M 13/021* (2013.01); *B23F 23/02* (2013.01); *B23F 23/1218* (2013.01); *B23Q 7/04* (2013.01); *B23Q 17/20* (2013.01); *B25J 15/0052* (2013.01); *B25J 21/00* (2013.01); *G01B 7/282* (2013.01); *G01B 7/283* (2013.01); *B23Q 2017/001* (2013.01)

(58) Field of Classification Search
CPC ........ G01M 13/021; B23F 23/02; B25J 21/00; B23Q 7/04; G01B 7/283
USPC ................................ 33/1 BB, 501.7, 501.19
See application file for complete search history.

(56) References Cited

U.S. PATENT DOCUMENTS

| | | | | |
|---|---|---|---|---|
| 4,519,241 A | * | 5/1985 | Hofler ..................... | G01B 7/283 33/501.9 |
| 5,016,471 A | * | 5/1991 | Och ..................... | G01M 13/021 33/501.13 |

(Continued)

*Primary Examiner* — G. Bradley Bennett
(74) *Attorney, Agent, or Firm* — Dinsmore & Shohl LLP

(57) ABSTRACT

An automation cell incorporating elements for performing secondary operations on a machined part is adapted to be disposed adjacent to a machining center for performing the primary operations on the part. The cell incorporates a robotic arm capable of being moved into position with respect to the machining center so as to load machined parts into the machining center and unload primarily machined parts for the performance of secondary operations in the cell. In a preferred embodiment the automation cell performs roll check operations on the primarily machined gear by bringing it into meshed engagement with a master gear and rotating the meshed gears and employing a sensor to monitor the roll-out of the machined gear.

15 Claims, 8 Drawing Sheets

(56) References Cited

U.S. PATENT DOCUMENTS

| | | | | |
|---|---|---|---|---|
| 5,667,351 | A  * | 9/1997 | Tokairin | B23Q 3/18 198/374 |
| 2004/0098162 | A1 * | 5/2004 | McGuire | B08B 3/02 700/159 |
| 2006/0254055 | A1 * | 11/2006 | Sabourin | G01M 13/021 29/893.1 |
| 2009/0249633 | A1 * | 10/2009 | Patrick | G01M 13/02 33/501.19 |
| 2015/0066390 | A1 * | 3/2015 | Chen | G01M 13/021 702/35 |
| 2015/0193919 | A1 * | 7/2015 | Nissen | G06T 7/001 348/92 |
| 2015/0338309 | A1 * | 11/2015 | Lazic | G01M 13/021 73/162 |
| 2016/0214805 | A1 * | 7/2016 | Ebihara | B65G 47/905 |

* cited by examiner

FLEXIBLE AUTOMATION CELL FOR PERFORMING SECONDARY OPERATIONS IN CONCERT WITH A MACHINING CENTER AND ROLL CHECK OPERATIONS

CROSS-REFERENCE TO RELATED APPLICATIONS

This application claims priority of U.S. Provisional Application No. 61/972,897 filed Mar. 31, 2014, the contents of which are incorporated herein by reference.

FIELD OF THE INVENTION

This invention relates to a flexible automation cell adapted to load blanks for production parts into an adjacent machining center for the performance of a primary operation, to unload the parts after performance of the primary operation, and to perform secondary operations, including checking the results of the primary operation on the unloaded part, and to a roll check operation for measuring gear run-out.

BACKGROUND OF THE INVENTION

Automated machining centers, often employing numerically controlled milling machines, lathes, or similar specialty machine tools such as gear grinding machines and the like, have come into widespread use to perform primary operations on workpieces. The parts produced by these machining centers often require secondary operations, such as the inspection of the parts for proper completion of the primary operation, cleaning the part by washing or the like, or the performance of additional machining operations. In present practice, these primarily machined parts are unloaded from the machining center and delivered to a separated machine for the performance of the necessary secondary operations. Often several secondary operations must each be performed in different machines and the part must further be transported between these machines. This multistage processing is often time consuming, requires substantial manual labor, and is wasteful of shop space.

SUMMARY OF THE INVENTION

To eliminate these inefficiencies, the present invention is directed toward an automation cell adapted to be located immediately adjacent to a machining center and incorporating robotic means for loading the machining center with blanks to be operated on by performance of one or more primary operations, and the ability to remove the primary machined parts to the automation cell for inspection and the performance of one or more secondary operations. The output of the automation cell constitutes parts which have been primarily machined, passed inspection, and had some or all of the necessary secondary operations performed in the cell. This arrangement greatly improves the speed of producing finished parts; eliminates the labor necessary to load, unload, and transport the parts between machines; and conserves shop floor space.

While a preferred embodiment of the invention employing a novel run-out roll inspection operation performed in the automation cell is disclosed, the broader aspects of the present invention are applicable to any part requiring primary operations to be performed in a machining center and secondary operations to be performed after the primary machining. The invention is not limited to the common numerically controlled milling machines or lathes but is applicable to any machining sequence amenable to a primary operation being performed in one machine and secondary operations being performed in one or more separated machines.

In the preferred embodiment of the invention the machining center constitutes a gear grinder and the associated automation cell inspects primarily machined parts that are received from the gear grinder for assurance that their run-out is within specified limits in a novel manner. The automation cell may also laser mark the parts and wash them to remove any residual materials from the primary machining operation. Unmachined blanks and the resulting primarily machined parts are transferred between the automation cell and the machining center by a robot. In the preferred embodiment of the invention the robot comprises a six axis electrically servo driven robot with high speed and precision. The robotic arm is equipped with a "dual gripper" tooling configuration that uses servo controlled gripper mechanisms to clamp and unclamp the parts. The servo controlled gripper mechanism also provides the ability to measure the part diameter to determine that the proper part style has been loaded into the machining center from the automation cell and that the part matches the current part selected for manufacturing.

The dual gripper tooling configuration allows the robot to perform a part exchange wherein, in a single cycle, the part blank is loaded from the automation cell into the machining center and a primarily machined part is removed from the machining center to the automation cell for the performance of secondary operations, preferably including inspection.

The automation cell of the preferred embodiment employs a part wash and spinoff station used to remove material fines and excess cutting fluid from the machined parts. It also incorporates a laser marking which will mark the part with an assigned 2D code or serial number that can be used for traceability of the workpiece. The cell contains a controller that can record and store data for each gear that is logged to the unique serial number.

In the preferred embodiment of the invention the parts being operated on are ground gears and the inspection performed in the automation cell constitutes a novel process for checking gear run-out from center line during meshed rotation of the machined gear against a qualified master part. Broadly, the machined production gear is loaded into a powered spindle for rotation and the master gear is supported for rotation on a slide capable of movement toward and away from the production gear along an axis which is essentially normal to the rotational axis of the production gear. The slide rotatably supports the master gear and is preferably powered pneumatically to move the master gear into meshed engagement with the rotating production gear. As the two rotate, the slide support is forced laterally to the rotational axis against the fluid driver, as a result of gear run-out from center line. This motion is sensed and a signal from the sensor is provided to a controller that will determine whether the maximum run-out value exceeds an acceptable limit. If it does exceed this limit, the gear will be tagged as a reject.

BRIEF DESCRIPTION OF THE DRAWINGS

Other objectives, advantages, and applications of the present invention will be made apparent by the following detailed description of a preferred embodiment of the invention. The description makes reference to the accompanying drawings in which.

DETAILED DESCRIPTION OF THE PREFERRED EMBODIMENT

Figure 1:
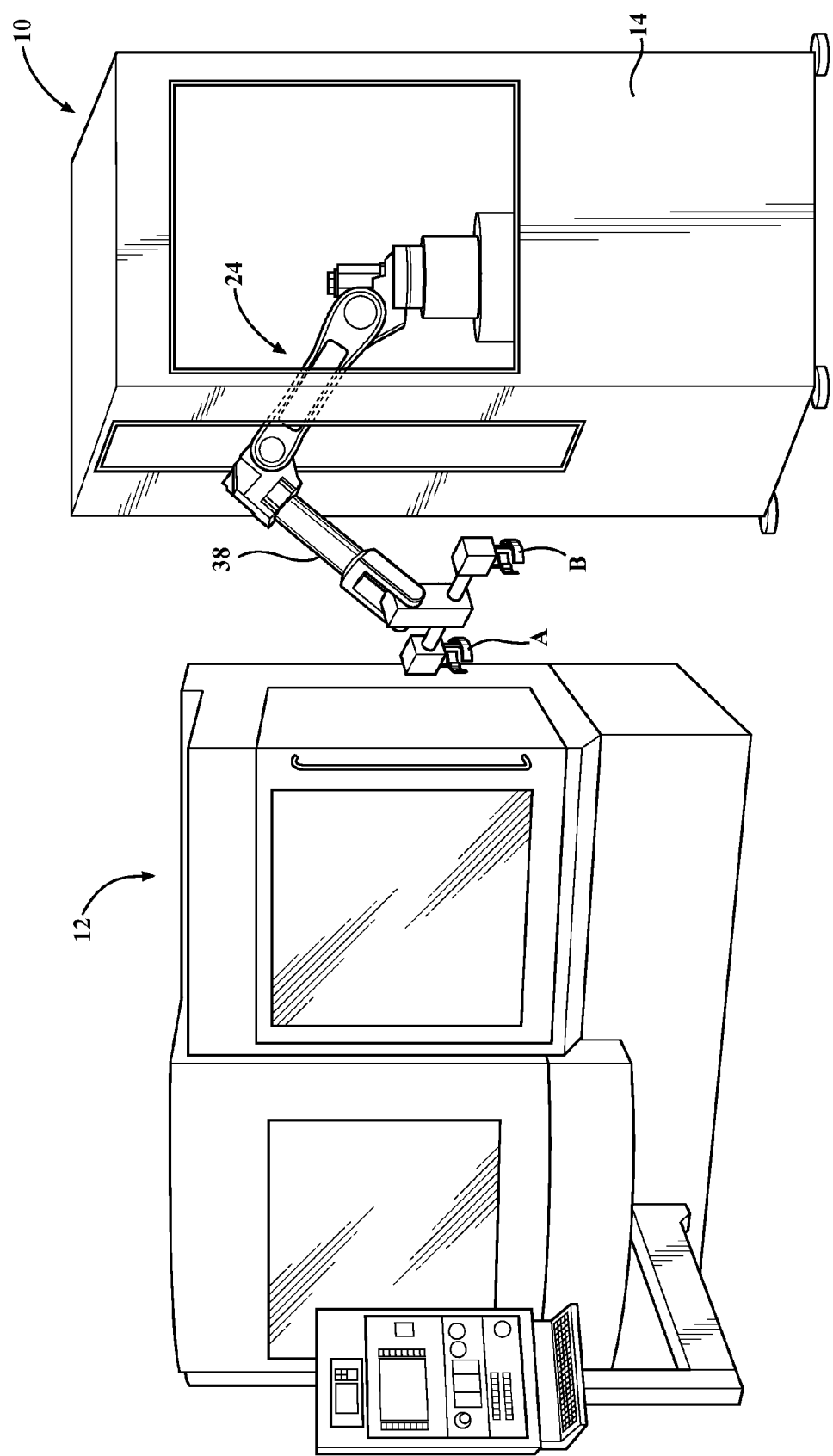
FIG. 1 is a perspective view of a commercially available gear grinding machine and an adjacent automation cell embodying the present invention.

As illustrated in FIG. 1, the automation cell 10 of the present invention coordinates and is disposed adjacent to a machining center 12 that performs primary operations on workpieces. Typical machining centers constitute numerically controlled milling machines or lathes or other specialty machines such as the gear grinder employed in the preferred embodiment of the present invention. The machining centers could constitute "tool changing" machine centers employing a variety of cutters that can be alternatively employed by the machine such as tool changing milling machines.

As has been noted, the preferred embodiment of the present invention relates, among other things, to the automation cell 10 for performing secondary operations on a gear after a gear blank has been initially ground in a modular gear grinding machine 12 such as is illustrated in FIG. 1. These commercially available machines may be equipped with one or more work spindles which may be automatically moved into an easily accessible loading and unloading position. The illustrated machine is manufactured by Reishauer.

Figure 2:
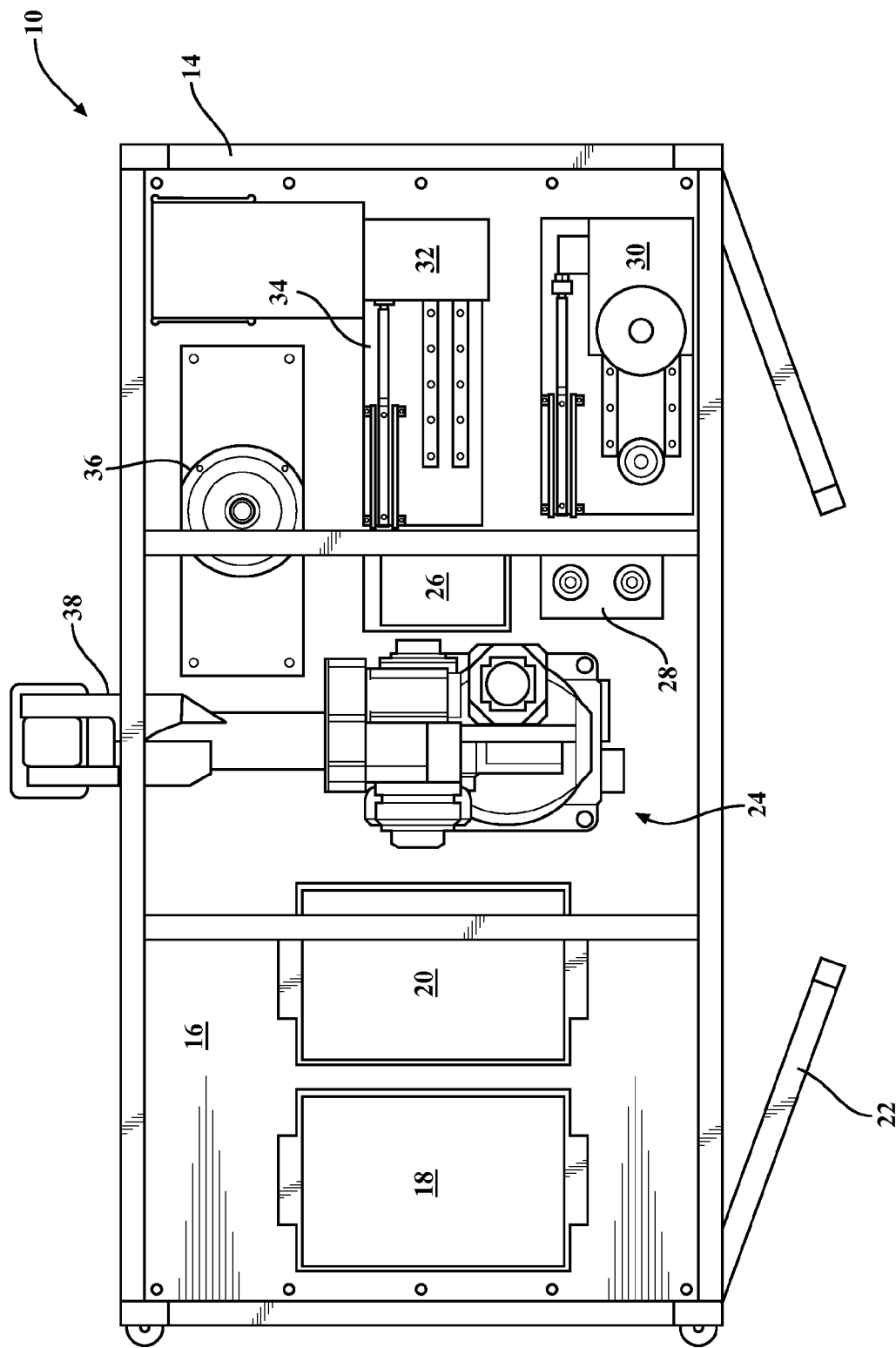
FIG. 2 is a plan view of the automation cell forming part of the present invention.
Figure 3A:
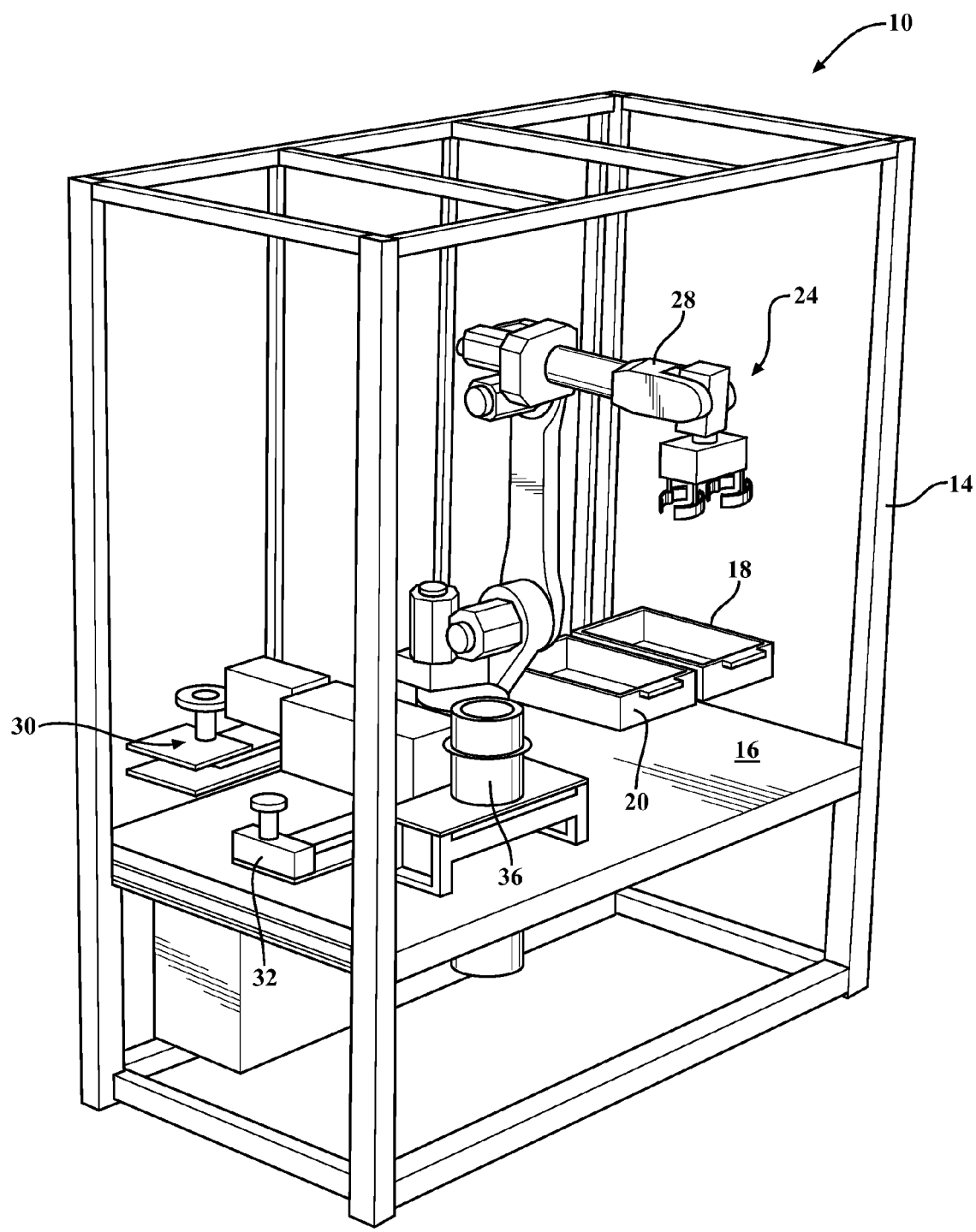
FIG. 3A is a perspective view of the preferred embodiment of the automation cell of the present invention from the upper corner of the front, with the side panels removed.
Figure 3B:
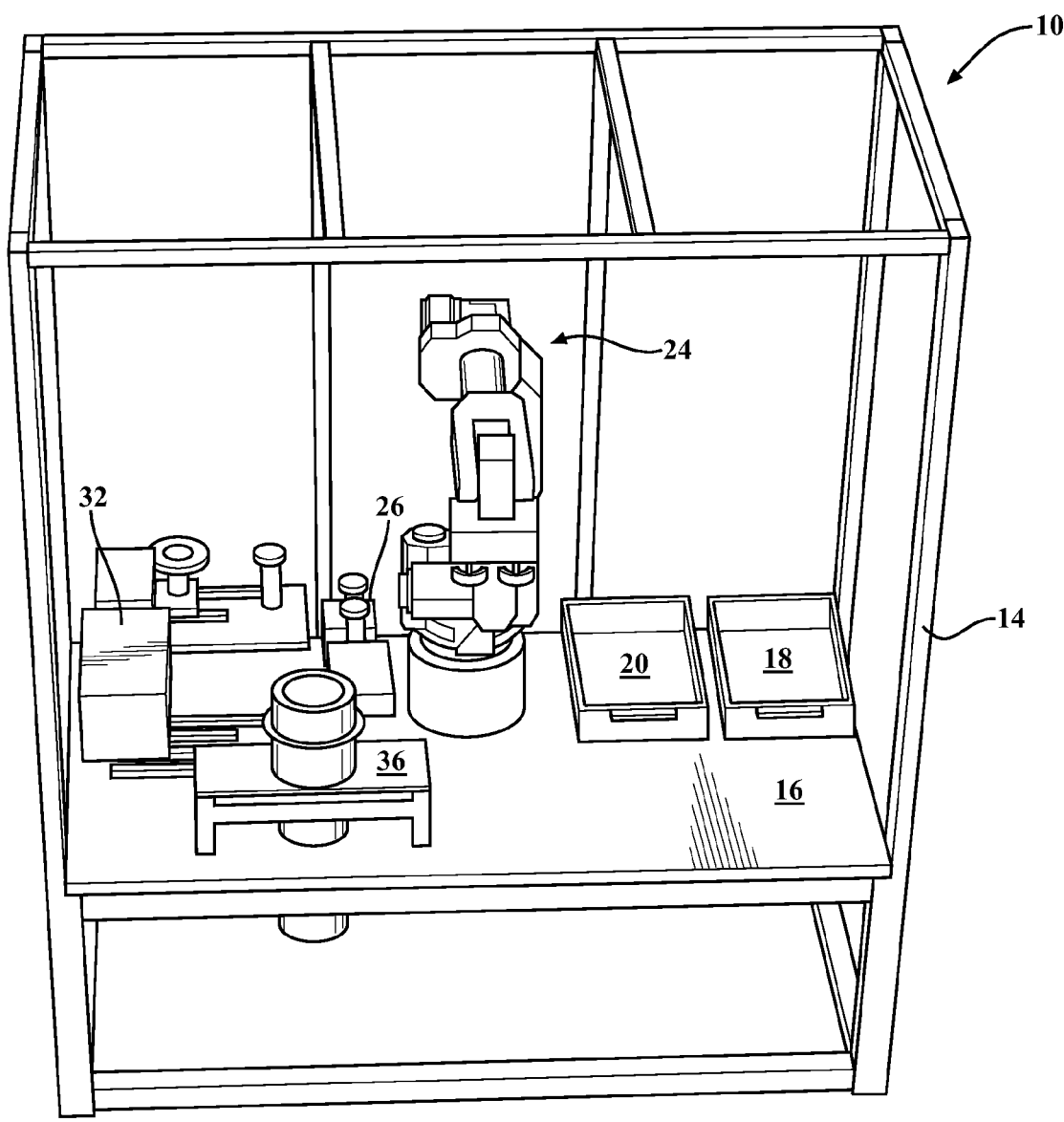
FIG. 3B is a perspective view of the automation cell from the upper rear, with the side panels removed.
Figure 4:
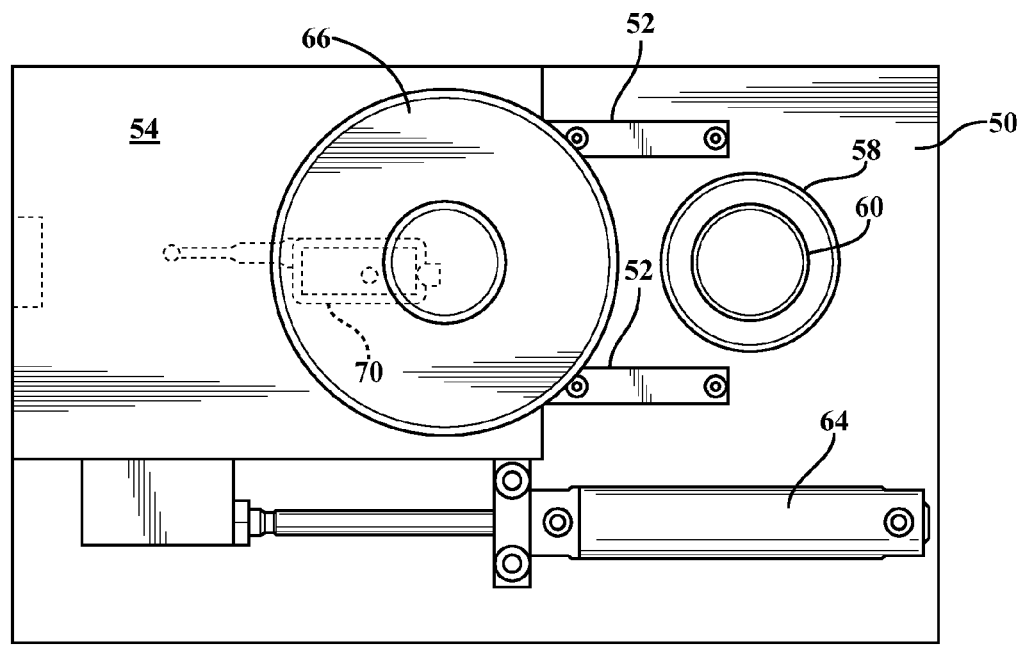
FIG. 4 is a plan view of the roll checking mechanism of the present invention.
Figure 5:
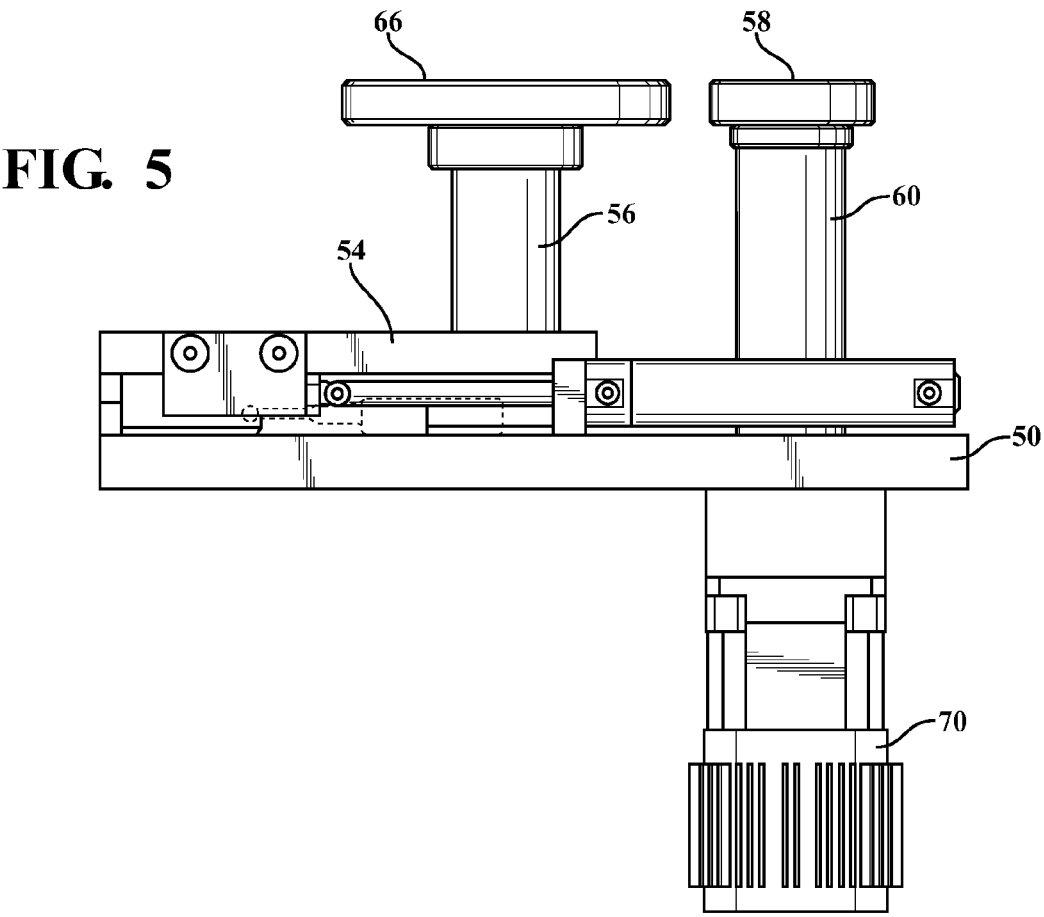
FIG. 5 is an elevation view of the roll checking mechanism of FIG. 4.
Figure 6:
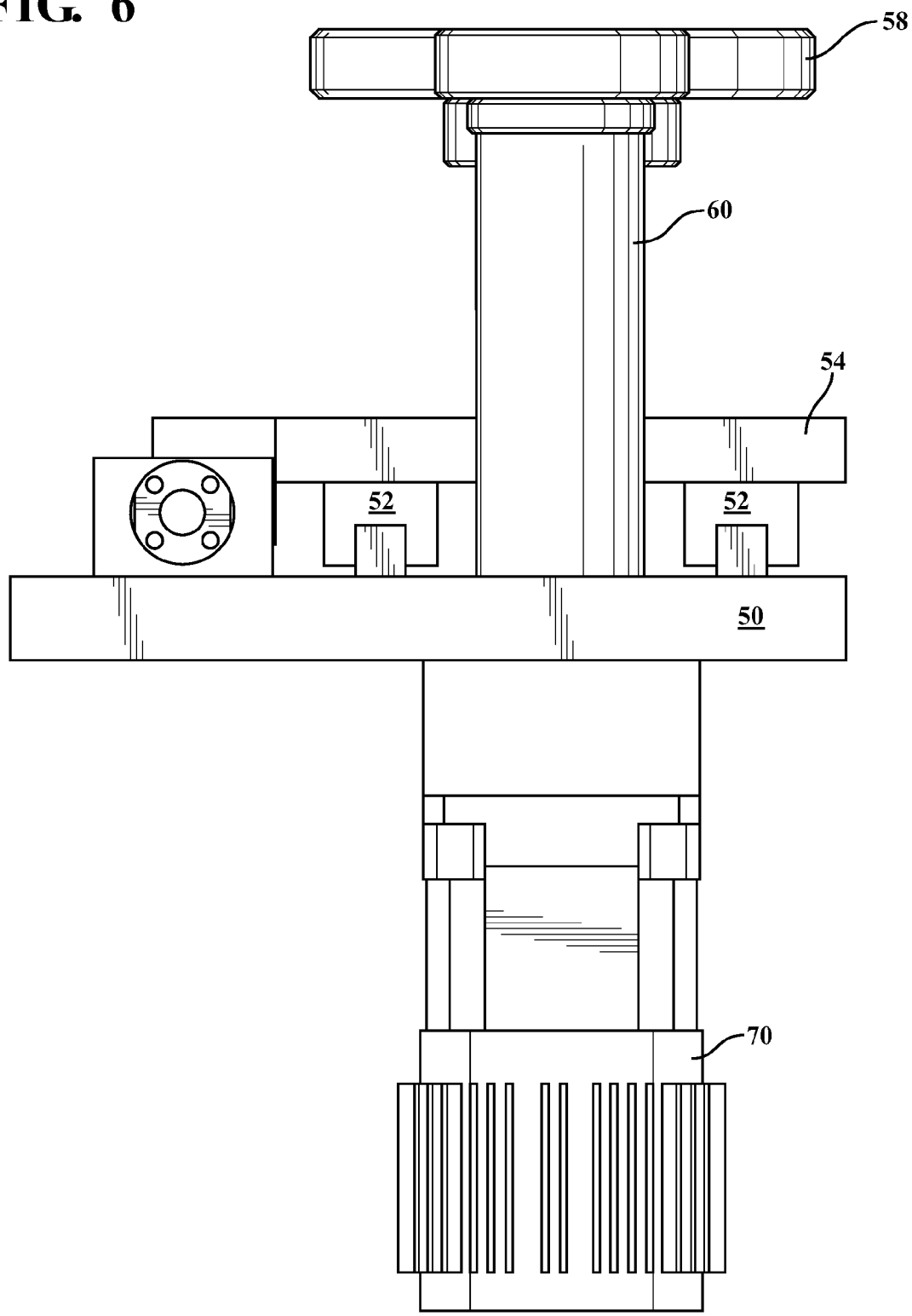
FIG. 6 is an end view of the roll checking mechanism of the present invention.
Figure 7:
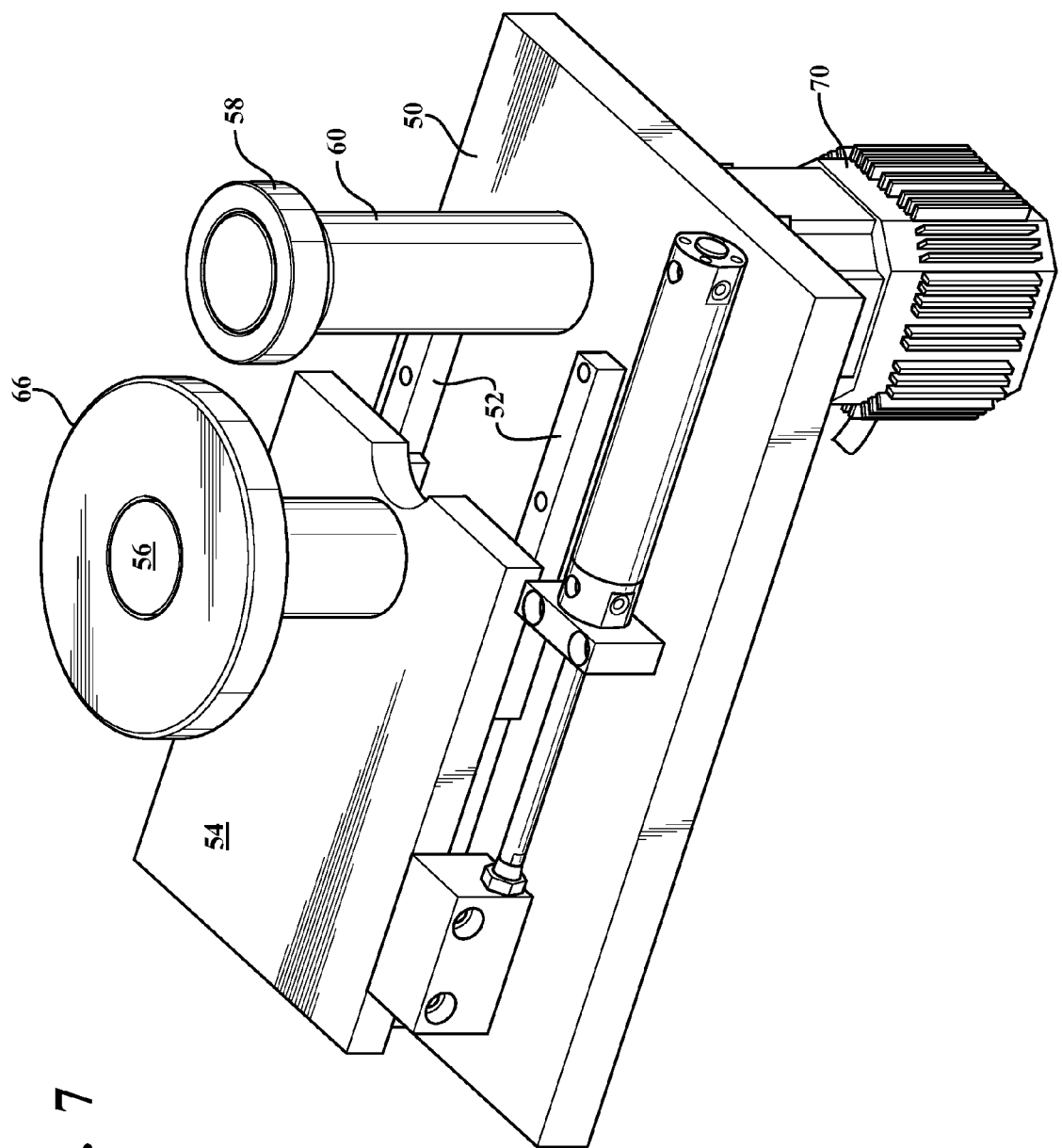
FIG. 7 is a perspective view from the upper side of the roll checking mechanism of the present invention.

The automation cell 10 is generally indicated in the plan view of FIG. 2 and in the two perspective views of FIGS. 3A and 3B. The cell is enclosed by a rectangular framework 14. The framework supports side and top panels which enclose the automation cell 10 but which are not shown in FIGS. 2, 3A, and 3B for purposes of illustration. The panels are typically formed of plastic and may be translucent.

The frame 14 supports a horizontal table 16. The table supports a pair of trays 18 and 20. The tray 18 is used to receive incoming parts, that is blanks that have not been primarily machined. These may be loaded either manually or automatically through two access doors 22 in the side panels. The tray 20 is for outgoing parts, that is parts that have been primarily machined in the machining center 12, returned to the automation cell 10, undergone the secondary operations provided by the automation cell, and passed inspection.

In its central section the table 16 supports a robot 24 which can move incoming parts from the tray 18 into the machining center 12, can retrieve the primarily machined parts, move them between the secondary operation devices supported in the automation cell 10, and place the completed parts, those which passed the inspection, in the outgoing part tray 20. Completed parts which do not pass the inspection provided by the automation cell 10 are placed by the robot 24 into a reject part bin 26.

The robot 24 is programmable and preferably constitutes a six axis of freedom robot.

The robot 24 is programmed to place certain sample parts which have been completed and passed inspection into an SPC (statistical process control) post assembly 28. For example, every fiftieth part which has passed inspection may be moved into the post 28 where it may be removed and externally inspected to ensure that the automation cell is meeting the required inspection standard.

The parts removed from the machining center 12 by the robot 24 are first loaded into a roll check assembly 30. This assembly, which will later be explained in more detail, is a novel unit for checking gear run-out from center line during rotation of the machined gear against a qualified master part. This run-out measurement is compared to a stored maximum value. The machined parts that do not meet this roll-out specification are loaded by the robot into the reject part bin 26.

The automation cell 10 also has a laser marker 32 for the completed parts. This preferably constitutes a fiber type laser used for part marking. The laser will mark a part with an assigned 2D code/serial number that can be used for traceability of the workpiece. The cell can record and store data for each gear that is logged to the unique serial number. Possible data points for collection could be: 1) manufacturing machine number; 2) manufacturing machine spindle number (in the case of multi spindle machines); 3) date and time of manufacture; 4) roll check inspection results. The laser marker 32 further comprises a shuttle used to fix the gear and transport it under the laser marker in a sealed enclosure for marking.

The automation cell 10 further comprises a part washer 36 to wash the parts and rotate them to spin off moisture and the like, used to remove material fines and excess cutting fluid from the machined parts.

Figure 8:
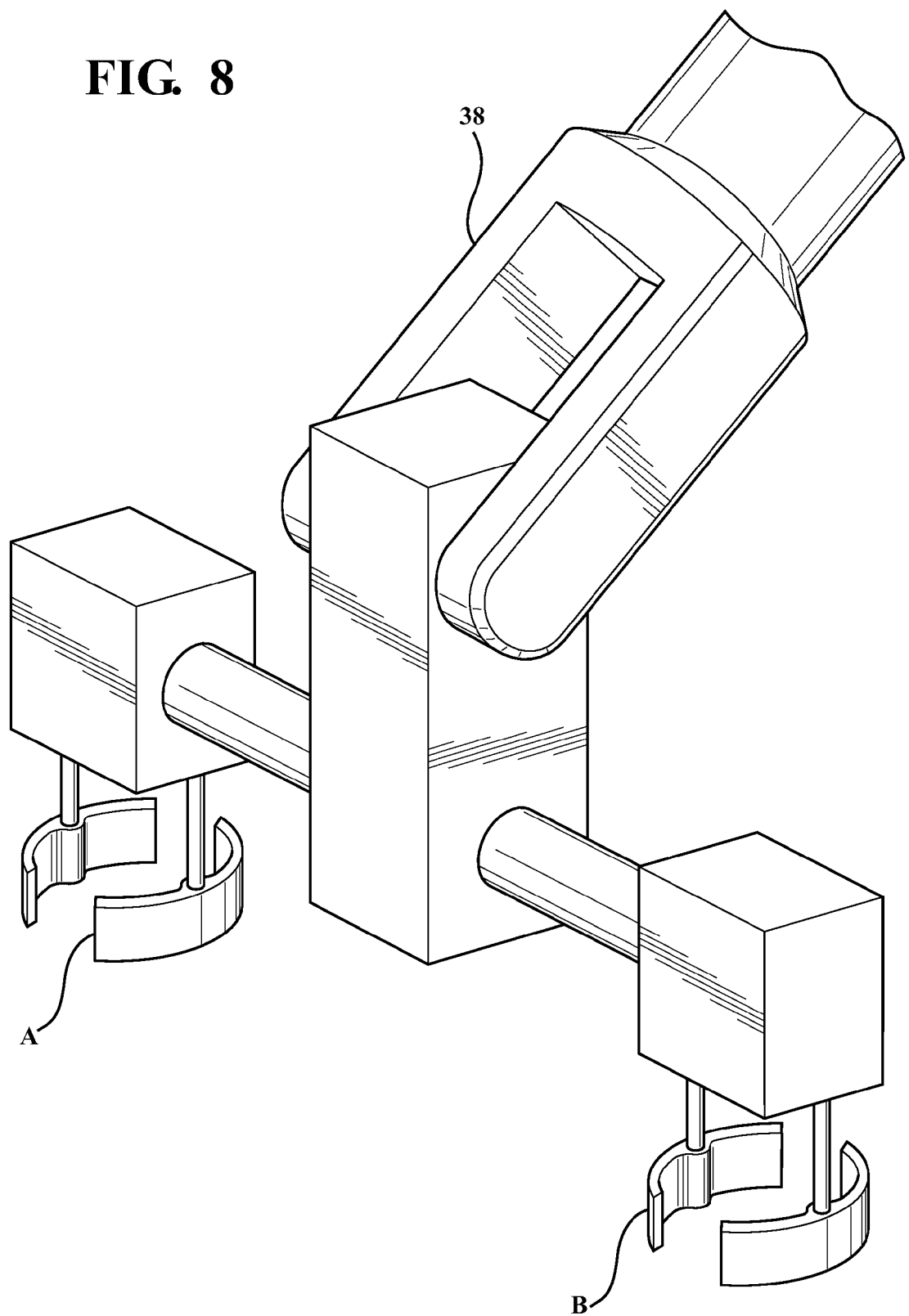
FIG. 8 is a detail view of the dual gripper mechanism support on the free end of the robotic arm forming part of the automation cell.

As has been noted, the robot 24 arm 38 has the capability of gripping two parts at a time in order to load one new part and remove one completed part from the gear grinder or other serviced machine 12. The detail of the arm end is illustrated in FIG. 8. Each of the grippers, labeled A and B, comprises a pair of concave sections facing one another, one of which can be moved toward and away from the other under suitable fluid power. The arm also includes gauging equipment which measures the closed positions of the movable gripper section against the part to provide a measurement of the part diameter and control the amount of force applied during the gripping process. The diameter measurement may be used to determine that the proper part style has been loaded in the incoming part tray, and that the part matches the current part selected for manufacturing.

A preferred embodiment of the roll check assembly 30 is illustrated in FIGS. 4-7. The roll check assembly is supported on a base plate 50. A pair of linear bearing rolls 52 extend parallel to one another on the base and support a master gear slide table 54. The master gear slide table 54 has a spindle 56 for supporting a master gear 66, extending from its upward surface. A gear for inspection 58 is supported on an ID clamp on a second spindle 60. The spindle 60 is located between the linear rolls 52. A pneumatic cylinder 64 with adjustable pressure control drives the slide table 54 toward the spindle 60 to bring the master gear 66 into mesh with the machined gear 58. In operation, the motor 70 rotates the machined gear 58 as well as the master gear 66 which is in mesh with the machined gear 58. Any deviation in roll-out from the center line in the machined gear will force the master gear slide table 54 to move away from the center line of the machined gear 58. An LVDT 70, best seen in FIG. 4, senses the position of the slide table and feeds an amplified signal in the millivolt or milliamp range to a processor that translates these signals into a linear position. These signals are stored and compared with a stored value for maximum roll-out to segregate the proper machined gears from the improper gears. By adjusting the pressure control on the cylinder 64, the slide 54 can be accurately followed by movements of the shaft of the cylinder 64.

In alternative embodiments of the invention the master gear could be powered into rotation rather than the machined gear.

The sequence of operation of the roll check device is as follows:
1. Operator installs the appropriate master gear on the spindle 56 for the selected production part.
2. Operator installs the appropriate machined gear ID clamp mandrel on the spindle 60 for the selected production part.
3. The robot 24 places a machined gear onto the driven spindle 60.
4. The driven spindle ID clamp will actuate, clamping the part on the ID (internal diameter).
5. The slide table 54 then is actuated forward by the pneumatic cylinder 64 to engage the machined gear with the master gear.
6. The machined gear then starts to rotate. During initial rotation, the LVDT 70 is monitoring the linear position of the slide table to first ensure the production and master gears have meshed. Once the mesh is realized, the production gear will now monitor the rotation to ensure 1.5 revolutions of the production piece while the LVDT is monitoring the slide table position for gear run-out.
7. Once the inspection cycle is complete, the slide table retracts back to the load/unload position and the driven spindle unclamps the ID part clamp of the production piece.
8. Now the cycle is complete and the material handling device is clear to remove the machined gear and load the next one, re-starting the cycle again at step 3.

The sequence of operation of the entire system is as follows:
1. Operator loads a full tray of "Green" part blanks in the incoming part tray 18, and an empty tray 20 at the outgoing part tray position.
2. Operator closed the access door and presses a start button.
3. The robot 24 travels to the incoming tray position and removes a green part with gripper A.
4. The robot then travels to the grinding machine and removes a finished part with gripper B, and places a green part with gripper A and moves out clear of the machine (at this point the machine starts its cycle).
5. The robot travels to the part wash position 36 and removes a finished/washed part with gripper A, and places the finished/dirty part in the washer with gripper B and moves up clear of the washer (at this point the washer starts its cycle).
6. The robot travels to the roll checker 30 and removes a full inspected part from the checker fixture with gripper B, and places the cleaned finished part in the checker fixture with gripper A and moves clear of the roll checker (at this point the roll checker starts its cycle).
7a. The robot 24 travels to the laser marker shuttle 34 and removes a marked part with gripper A, and places the inspected part in the shuttle fixture with gripper B and moves up clear of the shuttle fixture (at this point the shuttle fixture moves into the laser position for marking the part).
7b. If the inspected part does not pass the roll check, the robot will move to the reject bin and deposit the part.
8. The robot travels to the outgoing tray position 20 and places the machined, washed, inspected and laser marked part into the outgoing part tray.
9. Cycle now starts over at sequence number 3.

Having thus disclosed our invention, we claim:

1. An automation cell for performing secondary operations on a machined part for use with a machining center for performing primary machining of the part, the automation cell comprising:
   a cell housing;
   a robot supported in the cell housing and comprising an elongated arm and a servo controlled gripper mechanism disposed on an end of the arm;
   the housing being adapted to be positioned adjacent to said machining center which performs a primary machine operation on the part and the robotic arm being supported so that the gripper disposed end moves between the housing and the machining center to allow parts to be moved between the machining center and the housing; and
   an operating assembly supported in the housing for performing secondary operations on parts after they have been machined in the machining center.

2. The automation cell of claim 1 wherein the secondary operations performed in the cell on parts initially machined in the machine center include checking operations on the primary machining operation performed by the machining center on the parts.

3. The automation cell of claim 1 wherein the gripper mechanism supported on the end of the robotic arm can support two parts simultaneously so that a part to be machined can be loaded into the machining center and a part which has been machined in the machining center can be moved to the housing for the performance of secondary operations.

4. The automation cell of claim 1 wherein the gripper supported on the end of the robotic arm provides the capability of measuring the diameters of circular portions on the part.

5. The automation cell of claim 1 wherein the machining center is a gear grinder and the housing incorporates a roll checker for gears ground in the machining center.

6. The automation cell of claim 5 wherein the roll checker employs a master gear and compares a gear machined by the machining center with the master gear to check the machined gear run-out from the center line.

7. The automation cell of claim 1 further incorporating a controller adapted to receive signals from the roll checker as an aid in segregating properly machined gears from improperly machined gears.

8. The automation cell of claim 6, further comprising:
   a drive for rotating a machined gear about a central axis;
   a slide movable along an axis extending normally to said central axis;
   a master gear rotatably supported on the slide with its axis of rotation parallel to the central axis of the machined gear;
   a drive for moving the master gear into engagement with the machined gear; and
   a sensor detecting motion of the slide resulting from run-out of the machined gear.

9. A roll checker for machined gears to detect their roll-out from center line comprising:
- a spindle for rotatably supporting a machined gear about its central axis;
- a slide movable along an axis extending normally to said central axis;
- a master gear rotatably supported on the slide with its axis of rotation parallel to the central axis of the machined gear;
- a drive for moving the slide to bring the master gear into meshed engagement with the machined gear;
- a drive for rotating the meshed machined gear and master gear; and
- a sensor detecting motion of the slide resulting from run-out of the machined gear relative to the master gear.

10. The roll checker for machined gears of claim 9 wherein said drive for moving the slide to bring the master gear into meshed engagement with the machined gear comprises a fluid drive.

11. The roll checker of claim 10 wherein the fluid drive constitutes a pneumatic drive.

12. The roll checker for machined gears of claim 9 wherein the drive for rotating the meshed master and machined gear about a central axis constitutes a motor for rotating said machined gear.

13. The automation cell of claim 7 further comprising a device for receiving and supporting a statistically significant number of properly machined gears for removal for statistical process control purposes.

14. The automation cell of claim 1 wherein the secondary operations include laser marking of the parts with a unique identification code.

15. The automation cell of claim 1 further comprising an electronic controller for controlling the robotic arm and passing a machined gear through the secondary operations performed in the cell.

* * * * *